April 15, 1969     K. W. JOHNSON     3,438,738
TRANSFORMER INCIPIENT FAULT DETECTION
Filed June 1, 1965
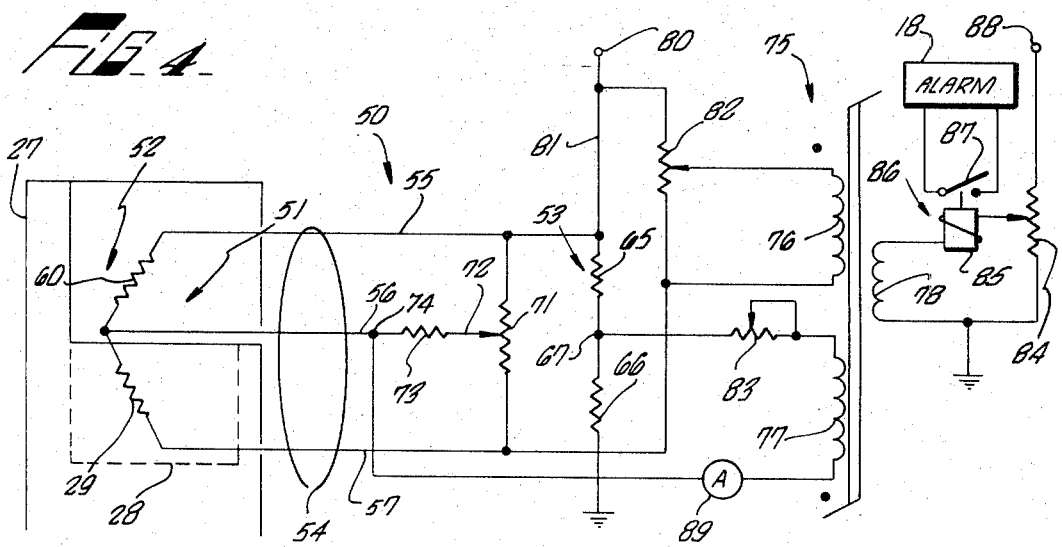
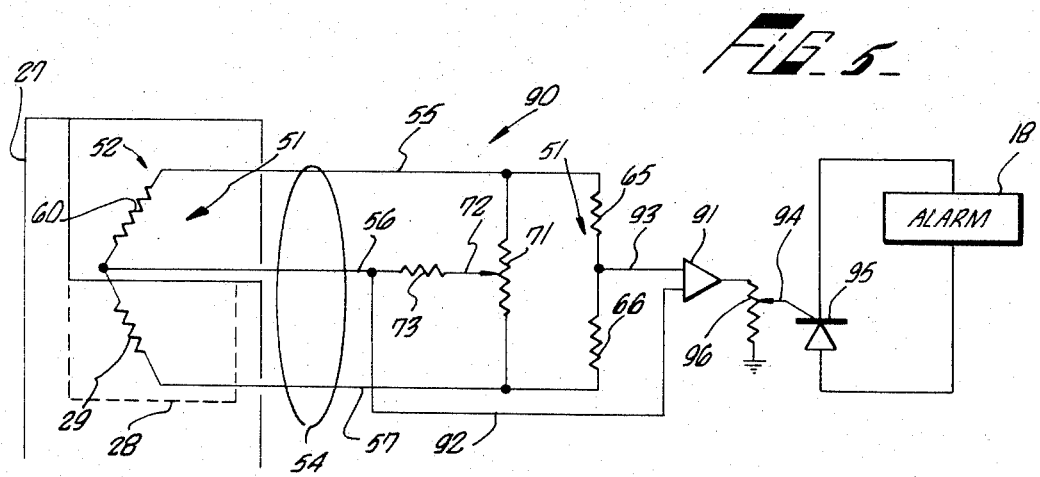
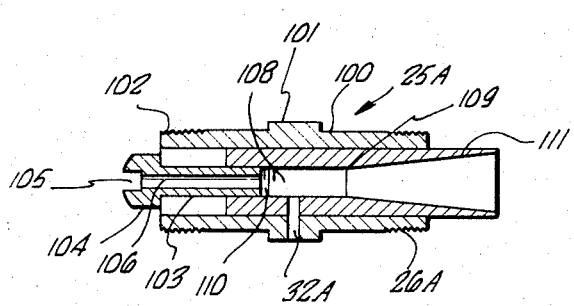
INVENTOR.
KENNETH W. JOHNSON
BY
Robert R. Thornton
ATTORNEY.

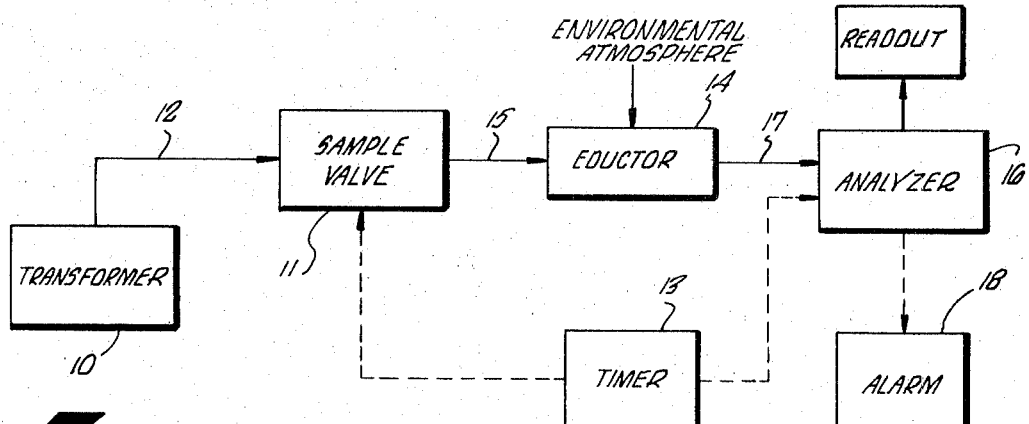
FIG_1
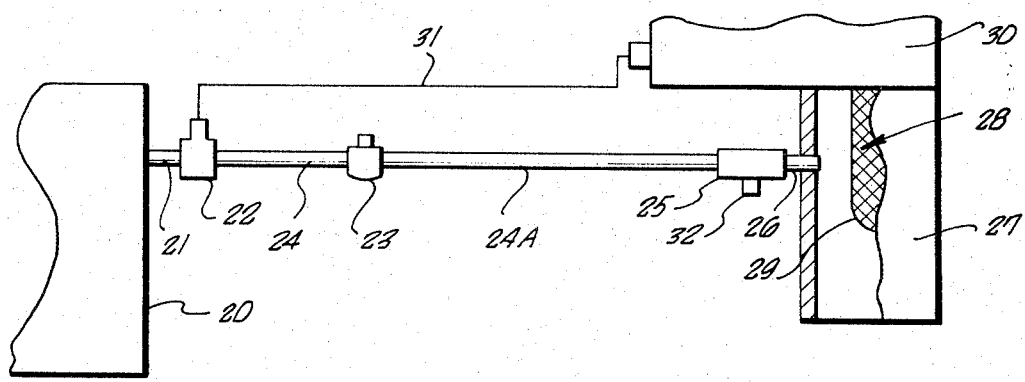
FIG_2
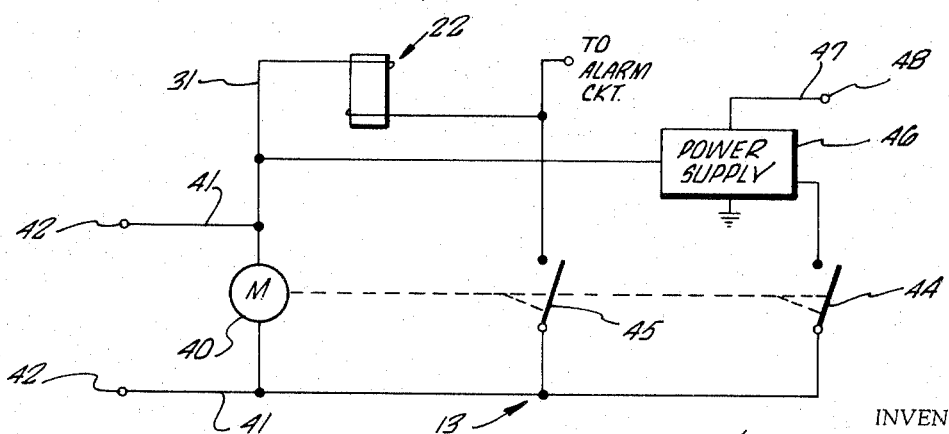
FIG_3
INVENTOR.
KENNETH W. JOHNSON
BY
Robert R. Thornton
ATTORNEY.

United States Patent Office 3,438,738
Patented Apr. 15, 1969

3,438,738
TRANSFORMER INCIPIENT FAULT DETECTION
Kenneth W. Johnson, Palo Alto, Calif., assignor to Johnson-Williams, Inc., Mountain View, Calif., a corporation of California
Filed June 1, 1965, Ser. No. 460,279
Int. Cl. G01n 27/62, 31/00
U.S. Cl. 23—232                                     6 Claims

ABSTRACT OF THE DISCLOSURE

Detection of incipient faults in transformers having an insulating fluid in contact with an inert gas under pressure. The gas under pressure is periodically sampled, and the sample, under pressure, is applied to an eductor. The sample flow through the eductor educts air into the sample so as to form a combustible mixture. The mixture is applied to a catalytic filament type combustible gas detector.

---

The breakdown of organic materials utilized as insulators in electrical power transformers yields combustible gases. By detecting the existence of such combustible gases in a transformer and determining their concentration, an indication can be obtained as to the existence of incipient faults in the insulation material of the transformer. A method for such incipient fault detection in power transformers is described in U.S. Patent No. 3,111,388. However, the aforesaid patent does not provide a device which is readily utilizable for the automatic periodic monitoring of transformers for incipient faults, especially at remote locations.

According to the present invention, automatic periodic monitoring of power transformers for incipient faults is accomplished by periodically sampling the atmosphere, usually an inert gas, which exists in the power transformer and with which the gaseous decomposition products, when they occur, become mixed, educting air from the surrounding atmosphere into the sample by means of the flow of the gas sample, so as to produce a sample mixture which includes sufficient oxygen to insure complete combustion of any combustibles in the atmosphere, passing said mixture over a catalytic type thermal detector, such as is described in U.S. Patent No. 2,023,731, so as to obtain a change in detector element resistance which is a function of the concentration of combustible gases in the sample, and monitoring the resistance change in the detector element as a result of the combustion of the sample.

The invention may be more readily understood by referring to the accompanying drawing, in which:

FIGURE 1 is a block diagram of a device utilizable in the practice of the invention;

FIGURE 2 is a view, partially in section, illustrating a portion of the device adapted for mixing the gas sample with air;

FIGURE 3 is a circuit diagram of an electrical power actuator circuit utilizable in the practice of the invention;

FIGURE 4 is a circuit diagram of one embodiment of detector circuit; and

FIGURE 5 is a circuit diagram of an alternate embodiment of detector circuit.

Referring now to FIGURE 1, a transformer 10 is of the type in which an organic fluid is utilized for insulation. The organic fluid does not completely fill the transformer, and the upper portion of the transformer contains an inert gas, such as nitrogen, under pressure. When the organic insulating fluid in the transformer begins to experience electrical breakdown, decomposition products are formed, which are combustible gases and which become mixed with the inert nitrogen in the transformer. By sampling this mixture of combustible gases and inert nitrogen, and determining its combustibility, an indication of the existence of incipient faults in the transformer installation is obtained.

A sample valve 11, which may be of any conventional type, preferably a solenoid-operated one, is connected to the transformer 10 by an appropriate conduit 12, such as tubing, so as to communicate directly with the inert gas in the transformer. Operation of the sample valve 11 is controlled by a timer 13. An eductor 14 is connected to the sample valve 11 at its outlet by a similar conduit 15. The conduit 15 thus applies the sample valve output to the eductor 14 as the educting fluid. An environmental atmosphere, such as air, functions as the educted fluid. An analyzer 16 receives the educted mixture of air and sample from the eductor 14 through a conduit 17.

The timer 13 also controls operation of the analyzer 16. An alarm 18 is actuated by the analyzer 16, upon the detection of a preselected change in the detector element resistance. The alarm may, of course, be any indicator or actuator circuit, as appropriate, to provide either a visual or audible alarm or to energize or de-energize circuitry.

Referring now to FIGURE 2, an electrical transformer casing 20, containing a transformer of the type utilizing organic insulating fluid and nitrogen under pressure, has a sample outlet tube 21 connected to the upper portion thereof so as to communicate with the pressurized nitrogen. A solenoid valve 22 has its inlet connected to the outlet tube 21, and its outlet connected to the inlet of a pressure regulator 23 by a pressure regulator inlet tube 24. Alternatively, the regulator 23 and valve 22 relative positions can be interchanged. The pressure regulator output is applied to an eductor 25 by a connecting tube 24A. The eductor 25 is mounted, by means of a short threaded tube 26, on the sidewall of a cylindrical protective cover 27 for a catalytic detector element 28, shown as being enclosed by a protective screen 29. The detector element 28 is mounted at the base of an enclosure 30, which contains the analyzer and alarm circuitry and the timer heretofore described with respect to FIGURE 1. An electrical power lead 31 extends between the solenoid valve 22 and timer, not shown, in order to apply power to the solenoid valve, as appropriate to obtain samples of the gas mixture in the transformer 20. The pressure regulator 23 reduces the pressure of the sample extracted in order to insure that proper eduction action takes place in the eductor 25 and an educted mixture of proper proportions contacts the detector element 29.

The eductor 25 has an air inlet 32 which is open to the atmosphere. As the gas sample passes through the eductor 25, air is drawn through the air inlet 32 and becomes mixed with the gas sample. By controlling the pressure at which the gas sample is applied to the eductor, by means of the gas pressure regulator 23, and utlizing an open air inlet, a mixture having a predetermined ratio of gas sample to air is obtained for the particular characteristics of eductor utilized. Since the oxygen content of air is a constant, a reproducible reference is established for the measurement of the combustibility of the gas sample, and the presence of sufficient oxygen in the mixture is insured in order to provide proper detector operation by acomplishing complete combustion at the detector element.

The air-gas sample mixture, upon leaving the eductor 25 and passing through the tube 26, flows through the protective screen 27 and its combustion initiates the change in detector element resistance appropriate for combustible gas concentration, which change is detected by the analyzer circuitry illustrated in greater detail in FIGURE 3. It will be noted that the protective cover 27 is simply a cylinder which is open at its lower end. The upper end of the cylinder 27 is attached to the base of the closure 30 as to form a weatherproof seal. Upon the completion of an analysis, the remaining sample passes by diffusion through the open lower end of the cover 27, thus avoiding contamination of the detector 28 during a subsequent analysis.

While, as is described in the aforesaid U.S. Patent No. 3,111,388, a variety of gaseous decomposition products may be formed by incipient faults, it has been found that a satisfactorily accurate determination of the performance of the transformer insulation can be obtained by assuming the decomposition products to consist entirely of hydrogen and to actuate the alarm circuitry upon the detection of a combustible gas concentration corresponding to 0.75% hydrogen in the gas sample. Other bases of calibration can be utilized successfully, provided they have a heat of combustion roughly equivalent to 0.75% hydrogen. A greater measure of safety, or adaption to other circumstances, may in certain instances well require the detection level to be less or greater, as appropriate for the particular application.

Referring now to FIGURE 3, a block diagram of one embodiment of timer 13 for use in the invention is shown. The timer 13 includes a motor 40, which is either wound or geared so as to have an extremely low output revolution rate. The motor is energized by power applied to a pair of leads 41 at terminals 42, to which an electrical potential is applied. The motor output actuates a pair of switches 44, 45. The switch 44 is closed prior to the closing of the switch 45. Therefore, electrical potential is applied to a power supply 46 prior to the application of power to the solenoid valve 22. The power supply and measuring circuit is thus allowed to stabilize before exposure of the sample to the detector. A suitable time program has been found to be closure of switch 44 for five minutes, with switch 45 closed during the second half of this period. The output of the power supply is supplied by an output lead 47 to an output terminal 48, to energize electrical circuits in the analyzer 16. The alarm circuits are energized only during the time that switch 45 is closed, to eliminate the possibility of actuation of the alarm due to instabilities associated with warmup of the power supply. One operation of the analyzer every 24 hours is sufficient.

FIGURE 4 is a circuit diagram of an embodiment of detector circuit suitable for utilization as the analyzer of the invention. In FIGURE 4, a combustible gas detector 50 has the impedance bridge 51, divided into a detector portion 52 and a fixed portion 53 which are connected together by a connector, indicated by the loop 54. The connector 54 contains a first electrical conductor 55, a second electrical conductor 56, and a third electrical conductor 57, extending between the detector portion 52 and the fixed portion 53. The detector portion 52 includes a reference impedance element 60 and the catalytic filament element 29. The element 60 is enclosed within the enclosure 27 so as to be protected from gas flow, but exposed to the same temperature environment.

The fixed portion 53 includes a pair of matched impedances 65, 66, which may be fixed resistors, connected together at a junction 67 so as to be connected between the first and third conductors 55, 57. The impedances 29, 60, 65, 66, thus form a Wheatstone bridge. A zero-set potentiometer 71 is connected between the first and third conductors 55, 57, in parallel with the impedances 65, 66. The potentiometer 71 has its arm 72 connected by a zero-limit resistor 73 to the second conductor 56 at a junction 74.

A comparator 75, preferably of a rectangular hysteresis magnetic core type having a first magnetic state and a second magnetic state, has a bias winding 76, a signal winding 77, and an impedance-controlled winding 78. An electrical input terminal 80 has a DC potential applied thereto from the power supply. For the dot notation used, the potential will be positive. A potential input lead 81 is connected between the terminal 80 and the first conductor 55, so as to apply the electrical potential to the bridge circuitry. A comparator actuation control means, shown for purposes of illustration as a bias potentiometer 82, is connected between the input lead 81 and the third conductor 57, so as to be connected in parallel with the fixed impedances 65, 66. The bias winding 76 is connected between the third conductor 57 and the arm of the potentiometer 82. The signal winding 77 is connected by a signal-adjust potentiometer 83 between the second conductor 56 and the junction 67 of the fixed impedances 65, 66. The impedance-controlled winding 78 is connected to control potentiometer 84 by means of an electromagnet 85 in an output relay 86. Energization of the electromagnet 85 closes a switch 87 in the output relay 86, so as to actuate the alarm 18.

In operation, the flow of current through the bias winding 76 produces a magnetic flux in the comparator 75 which opposes magnetic flux produced by current flow in the signal winding 77. The flow of current in the impedance-controlled winding 78, resulting from the application of a DC potential to an output terminal 88, is inhibited by the magnetic reluctance of the comparator 75, resulting from the current flow through the bias winding 76. The current flow in the bias winding 76 is sufficient, when the Wheatstone bridge is balanced, to hold the comparator in a first magnetic state, in which state the current flow through the output winding 78 is insufficient to energize the solenoid 86. However, in response to sufficient bridge unbalance, a flow of current through the winding 77, measured by a meter 89, in conjunction with the current flow through the impedance controlled winding 78, switches the magnetic comparator to its second magnetic state. The impedance opposing the flow of current through the impedance winding 78 as a result of magnetic comparator reluctance is greatly reduced, so that the current flow through the winding 78 increases and the ouput relay 76 is energized, thus actuating the alarm circuit.

Detector circuits somewhat similar to that described with respect to FIGURE 4 are described in my copending application Ser. No. 383,484, filed July 17, 1964, now U.S. Patent No. 3,350,703, and may equally well be utilized with the present invention.

An ammeter may be connected in series with the comparator winding 77, and calibrated in units of percentage of gas, to give a visual indication of proportion of combustibles present in the gas being sampled. This meter is also useful in balancing the Wheatstone bridge measuring circuit, when making initial or periodic adjustments. The ammeter may also be of the recording type, to give a permanent record of gas concentration. Typical sensitivity of the ammeter, whether recording or indicating, is 0–1 milliampere with internal resistance of 100 ohms.

Referring now to FIGURE 5, there is shown another embodiment of detector circuit for use with the present invention. In FIGURE 5, a detector circuit 90 includes certain components which may be identical to components heretofore described with respect to FIGURE 4, and which bear identical reference numerals. In addition, the detector 90 includes an output imbalance amplifier 91 to which the output of the Wheatstone bridge is applied through a pair of leads 92, 93. The amplifier 91 is of any conventional construction. The amplifier output is applied to the control electrode 94 of a silicon-controlled rectifier 95 as the control potential by means of a control potentiometer 96. The silicon-controlled rectifier 95 functions as a switch to open or close circuit continuity in the alarm 18.

The operation of the detector 90 of FIGURE 5 will be readily apparent. Unbalance in the bridge circuit 51, resulting from the application of a combustible gas to the catalytic filament 29, produces an amplified output signal by means of the amplifier 91 which, when of a magnitude preselected by the setting of the potentiometer 96, initiates conduction in the silicon-controlled rectifier 95. Conduction by the rectifier 95 actuates alarm 18. It will be understood that the alarm 18 is shown purely for illustrative purposes, and need not be necessarily a visual or audible alarm but can equally well be a relay circuitry to de-energize the transformer or the like. Thus, the alarm 18 is to be understood to be merely a device to provide an indication of a preselected measure of bridge impedance unbalance. Of course, a visible indication of bridge unbalance for each test can be obtained by utilizing a recorder or meter, if desired, either in conjunction with other types of alarm circuitry or independently thereof.

Referring now to FIGURE 6, a view is shown, in section, of an eductor 25A suitable for use in the practice of the invention. The eductor 25A has a main body shell 100 which includes a hexagonal nut portion 101 utilized to facilitate installation and removal of the eductor 25A. A threaded portion 26A is utilized to attach the eductor 25A to the protective cover 27 (see FIG. 2). A threaded portion 102 is utilized ot attach the tube from the gas regulator (see FIG. 2) to the eductor 25A. A jet 103 has an enlarged head 104 with a slot 105 formed therein. A longitudinal sample inlet passage 106 opens into the slot 105, and is utilized to pass the gas sample from the gas regulator into a mixing chamber 108 formed within an eductor inner body 109. The inner body 109 is disposed within the eductor outer body 100 and fixed thereto, by any conventional means. The outer surface of the jet 103 is threaded so as to engage threads 110 formed on a portion of the mixing chamber 108 wall so as to attach the jet 103 to the inner body 109. An air inlet passage 32A extends outwardly from the mixing chamber 108 through the inner body 109 and shell 100.

The eductor 25A of FIGURE 6 may be considered, by way of example, to be a scale drawing and have an actual overall length for the main body shell 100 of one inch. The sample inlet passage 106 and air inlet passage 32A, in one example of such an embodiment, are selected so as to be of a diameter substantially the same as that formed by a #60 drill. The gas pressure regulator is set so as to provide sample gas to the eductor 25A at a pressure of 0.5 p.s.i.g. The jet dimensions then limit sample gas flow rate to about 0.05 cubic feet per minute.

For such a gas pressure and flow rate, air is educted into the gas sample through the air inlet 32A so as to form a sample gas-air mixture of approximately two parts sample gas to one part air. Such a mixture ratio provides sufficient oxygen to insure complete combustion of the combustible gases contained in the gas sample for all combustible gas concentrations of interest. If the actual combustible gas concentration in the sample is greater than that concentration for which complete combustion is assured, there is danger of transformer breakdown. Sufficient combustion will still take place to actuate the alarm circuitry.

The occurrence and progression of incipient faults in transformers to breakdown is a sufficiently slow process that monitoring of transformers on a once-a-day basis normally protects against a catastrophic breakdown. In following such a routine, the timer actuates the analyzer circuitry for a period of about five minutes in the preferred embodiment of the practice of the invention. About two minutes after analyzer circuit actuation, circuit stabilization will have been achieved. The solenoid valve is then actuated to extract a gas sample from the transformer. The sample is applied to the eductor to obtain the necessary additional oxygen in order to make a proper analysis. The mixture is then applied to the detector, and the resulting change, if any, in the catalytic filament resistance is detected as a function of the percentage of combustible gas contained in the sample. This percentage is compared to a safe limit, which has been preselected, and if in excess thereof, the alarm circuit is actuated. Of course, if desired, meter circuitry or recorder circuitry can be utilized to obtain a visible indication of the analysis.

The invention claimed is:

1. A method for monitoring a transformer for incipient faults, comprising the periodic repetition of the steps of:
energizing a combustible gas detector having a detector element of the catalytic filament type;
obtaining a sample of normally inert gas under pressure which has been in contact with insulating material within the transformer;
educting oxygen in a predetermined ratio to gas sample into said gas sample by the eductive action of the sample flow to provide an oxygen-sample mixture;
applying said mixture to the energized detector;
detecting changes in detector element resistance in response to the application of the mixture; and
de-energizing the gas detector.

2. In a transformer incipient fault detector, the combination of:
means for periodically sampling normally inert transformer gas contained under pressure within said transformer;
an eductor;
means for applying the transformer gas sample to the eductor as an educting fluid;
means for applying air to the eductor as an educted fluid; and
means for applying the eductor gaseous output mixture to a catalytic filament type combustible gas detector.

3. The combination of claim 2, and in which said transformer has an insulating fluid contained therewithin whose decomposition produces a combustible gas, and in which the normally inert gas is in contact with the insulating fluid.

4. The combination of claim 2, and including a solenoid-operated valve and control means for periodically initiating the cyclical actuation and de-actuation of the solenoid-operated valve so as to cyclically apply a mixture of transformer gas and air to the combustible gas detector.

5. The combination of claim 4, and including analyzer means operable in response to detection by the detector of a preselected concentration of combustible gas in said output mixture to actuate an output circuit.

6. The combination of claim 5, and in which said control means periodically energizes said analyzer means, said analyzer means being energized prior to actuation of the solenoid-operated valve and thereafter de-energizes the analyzer means.

References Cited

UNITED STATES PATENTS

| | | |
|---|---|---|
| 1,940,513 | 12/1933 | Stein. |
| 2,302,061 | 11/1942 | Schirm. |
| 2,829,954 | 4/1958 | Dailey et al. |
| 3,021,200 | 2/1962 | Schoberle et al. _____ 23—255 |
| 3,111,388 | 11/1963 | Horelick et al. |

MORRIS O. WOLK, *Primary Examiner.*

R. M. REESE, *Assistant Examiner.*

U.S. Cl. X.R.

23—232, 254, 255; 340—237